US007748102B2

(12) United States Patent  
Manousiouthakis et al.

(10) Patent No.: US 7,748,102 B2  
(45) Date of Patent: Jul. 6, 2010

(54) METHOD FOR FABRICATING A CONDUCTION-COOLED HIGH-TEMPERATURE SUPERCONDUCTING CABLE

(75) Inventors: Vasilios Manousiouthakis, Los Angeles, CA (US); Young I Kim, Seoul (KR); Alberto Posada, Medellin (CO)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/340,425

(22) Filed: Jan. 25, 2006

(65) Prior Publication Data

US 2006/0260837 A1 Nov. 23, 2006

Related U.S. Application Data

(63) Continuation of application No. PCT/US04/27220, filed on Aug. 20, 2004.

(60) Provisional application No. 60/497,163, filed on Aug. 22, 2003.

(51) Int. Cl.  
*H01B 12/16* (2006.01)

(52) U.S. Cl. .................. 29/599; 174/125.1

(58) Field of Classification Search .......... 29/599; 174/15.5, 125.1; 505/163, 236, 885  
See application file for complete search history.

(56) References Cited

U.S. PATENT DOCUMENTS

| 3,719,052 | A | * | 3/1973 | White ................. 62/3.2 |
| 4,039,740 | A | | 8/1977 | Iwata |
| 4,392,362 | A | | 7/1983 | Little |
| 4,671,080 | A | | 6/1987 | Gross |
| 4,829,785 | A | | 5/1989 | Hersey |
| 4,858,512 | A | * | 8/1989 | Jasper, Jr. .............. 89/8 |
| 5,457,956 | A | | 10/1995 | Bowman et al. |
| 5,941,079 | A | | 8/1999 | Bowman et al. |
| 6,173,761 | B1 | | 1/2001 | Chandratilleke et al. |
| 6,255,595 | B1 | | 7/2001 | Metra et al. |
| 6,595,006 | B2 | | 7/2003 | Thiesen et al. |

(Continued)

FOREIGN PATENT DOCUMENTS

JP 01149311 A * 6/1989

(Continued)

OTHER PUBLICATIONS

Machine Translation of JP2000-082347.*

(Continued)

*Primary Examiner*—A. Dexter Tugbang  
*Assistant Examiner*—Livius R Cazan  
(74) *Attorney, Agent, or Firm*—John P. O'Banion (57) ABSTRACT

A conduction-cooled superconducting power transmission cable wherein a High-Temperature Superconducting (HTS) wire is surrounded by an inner layer of thermal insulator, one or more layers of high thermal conductivity material, such as copper, and an outer layer of thermal insulator with cryogenic coolant sources distributed along the power transmission cable and coupled to the copper layers or both the copper layers and the HTS wire. The cryogenic coolant sources can be reservoirs, a distribution system of coolant or stand alone refrigeration systems. He $H_2$ or $N_2$ liquid coolant can be used. A method for calculating the parameters to maintain the critical temperature of the HTS wire and a method for calculating the cool down time from ambient conditions are disclosed.

13 Claims, 3 Drawing Sheets

U.S. PATENT DOCUMENTS 6,596,945 B1    7/2003   Hughey et al.
6,967,051 B1 *  11/2005  Augustynowicz et al. ..... 428/68

FOREIGN PATENT DOCUMENTS

JP          07335044  A  *  12/1995
JP          2000082347 A  *  3/2000

OTHER PUBLICATIONS

Heat pipe, http://en.wikipedia.org/wiki/Heat_pipe.*
"Superconductive Transmission Line," translation of JP01149311, Aug. 2007, pp. 1-7.*

* cited by examiner

METHOD FOR FABRICATING A CONDUCTION-COOLED HIGH-TEMPERATURE SUPERCONDUCTING CABLE

CROSS-REFERENCE TO RELATED APPLICATIONS

This application claims priority from, and is a 35 U.S.C. § 111(a) continuation of, co-pending PCT international application serial number PCT/US2004/027220, filed on Aug. 20, 2004, which designates the U.S., incorporated herein by reference in its entirety, which claims priority from U.S. provisional application Ser. No. 60/497,163 filed on Aug. 22, 2003, incorporated herein by reference in its entirety.

This application is related to PCT International Publication Numbers WO 2005/020245 A2 and WO 2005/020245 A3, each of which is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to superconducting power transmission cables, and more particularly to conduction-cooling of high-temperature superconducting power transmission cables.

2. Description of Related Art

Current high-temperature superconducting (HTS) power transmission cable systems are cooled by convection using a coolant, such as liquid nitrogen, that circulates axially along the cable to keep the HTS cable below the superconducting transition temperature. This configuration requires a cable construction resembling a hose that must contain the coolant during operation. Coolant must be continually replenished in systems that do not recover the coolant. Cables are often hermetically sealed and coolant recovered, so as to reduce the cost of coolant production. Current cable designs are often limited to lengths of less than 200 meters due to these limitations. There are two basic HTS cable designs recognized for electric power transmission: the Warm Dielectric design (WD) and the Cold Dielectric Coaxial design (CDC). Examples can be found in Malozemoff AP, et al., "Power applications of high-temperature superconductors: status and perspectives," IEEE Trans. Appl. Supercond. 2002, 12(1): 778-781, and Kelley, N. et al., "Application of HTS wire and cables to power transmission: state of the art and opportunities," IIE Power Engineering Society Winter Power Meeting, January 2001, which describe current designs for superconducting power transmission cables.

BRIEF SUMMARY OF THE INVENTION

The invention is principally related to axial cooling of a superconducting cable. In general terms, the invention is a conduction-cooled superconducting power transmission cable wherein a High-Temperature Superconducting (HTS) wire is surrounded by an inner layer of thermal insulator, one or more layers of highly thermal conducting material such as copper, and an outer layer of thermal insulator with cryogenic coolant sources distributed along the power transmission cable and coupled to the copper layers or both the copper layers and the HTS wire. The copper layers remove ambient heat by conducting the heat axially along the cable thereby keeping the HTS wire below its superconducting transition temperature. The cryogenic coolant sources of the present invention can use helium, hydrogen, nitrogen, argon, neon, air, oxygen or mixtures thereof as a coolant. Cryogenic coolant sources are placed along the cable at predetermined distances from each other that may be greater than 50 meters, between a centimeter and 50 meters, or less than a centimeter. The cryogenic coolant source may vary in scale from a macro scale (for power transmission greater than 50 meters) down to a nano scale ($10^{-9}$ meters) for integration into microscopic instruments and equipment. The cryogenic coolant sources can be coolant reservoirs, part of a coolant distribution system, or stand alone or modular compressor systems, powered directly from electricity sourced from either the HTS wire or powered by external energy sources. Micro scale coolant sources can be Microelectromechanical systems (MEMS) and nano-scale coolant sources can be Nanoelectromechanical systems (NEMS).

Existing HTS power transmission cables use convection cooling with a cryogen, typically liquid nitrogen, as a coolant that circulates within the cable and along the HTS wire. In contrast, the present invention keeps the HTS wire at temperatures below the critical transition temperature through the use of cryogenic coolant sources positioned at the cable ends or distributed along the cable at periodic intervals, and coupled to a highly conductive material, such as copper, radially surrounding the HTS wire. The heat that enters the cable radially through the outer insulation layer is channeled axially, towards the cryogenic coolant source by the conducting copper layer instead of allowing the heat to move in the radial direction towards the cold HTS wire. This configuration is feasible due to the high thermal conductivity of copper and copper alloys at cryogenic temperatures.

One distinct advantage of this invention is cryogenic coolant sources are positioned only at periodic locations along the HTS cable. There is no circulation of a cryogenic fluid coolant axially along the cable to keep it cold and therefore no associated cost related to pumping and containing a cryogenic fluid in a cable.

An aspect of the invention is a conduction-cooled superconducting power transmission cable system that comprises a wire composed of a high-temperature superconducting material, an inner layer of thermal insulation surrounding the wire, a layer of heat conducting material surrounding the inner layer of thermal insulation, an outer layer of insulation surrounding the layer of heat conducting material, and means for cooling the wire at or below its superconducting transition temperature, the means coupled to the layer of heat conducting material.

Another aspect of the invention is a cable system where the superconducting wire comprises a material having a transition temperature at or below approximately 110 K.

A further aspect is where the wire comprises a superconducting material chosen from the group consisting of $(Bi,Pb)_2Sr_2Ca_2Cu_3O_{10}$, $YBa_2Cu_3O_7$ and $MgB_2$.

An aspect is where the heat conducting material comprises copper or copper alloys.

Another aspect where the means for cooling comprises a cryogenic coolant source.

A further aspect is where the cryogenic coolant source is adapted to use a coolant chosen from the group consisting of helium, hydrogen, nitrogen, argon, neon, air and oxygen.

A still further aspect is where the cryogenic coolant source is a stand alone cryogenic compressor system.

Another aspect of the invention is where the cryogenic coolant source is a modular cryogenic refrigeration system.

Another aspect is where the cryogenic coolant source is adapted to cool the cable system at length intervals of about 10 meters to at least about 200 meters.

A further aspect is where the cryogenic coolant source is adapted to cool the cable system at length intervals of about 1 meter to at least about 10 meters.

A still further aspect is where the cryogenic coolant source is adapted to cool the cable system at length intervals of about less than 1 meter.

Another aspect of the invention is where the cryogenic coolant source further comprises a microelectromechanical system (MEMS).

A further aspect is where the cryogenic coolant source further comprises a nanoelectromechanical system (NEMS).

Another aspect of the invention is where the cryogenic coolant source is adapted to use electricity sourced from the cable system or from an external source or both.

A further aspect is where the outer thermal insulation comprises one or more layers of a highly reflective radiant barrier material alternating with one or more layers of a low-conductivity spacer material.

A still further aspect is where the highly reflective radiant barrier material comprises aluminum foil.

Another aspect is where the low conductivity spacer material comprises fiberglass paper.

A further aspect is where the outer thermal insulation comprises a thermal conductivity of about $3.7 \times 10^{-5}$ W/m-K and a layer density of about 20 layer/cm.

A yet further aspect is where the radius of the wire is at least about 0.1 centimeter to about 1 centimeter.

Another aspect of the invention is where the radius of the wire is less than or about 0.1 centimeter.

A further aspect is where the cross section of the wire is rectangular.

A still further aspect is where the outer radius of the inner thermal insulation is at least about 2 centimeters.

Another aspect is where the outer radius of the outer thermal barrier is at least about 3 centimeters.

A further aspect is where the diameter of the cable system is at least about 20 centimeters.

A still further aspect is where the means for cooling is coupled to the wire.

Another aspect of the invention is a second layer of heat conducting material surrounding the outer layer of thermal insulation, and a second outer layer of insulation surrounding the second layer of heat conducting material.

An aspect of the invention is a conduction-cooled superconducting cable system, comprising a wire composed of a high-temperature superconducting material, an inner layer of thermal insulation surrounding the wire, a plurality of heat conducting material layers surrounding the inner layer of thermal insulation, a plurality of insulation layers surrounding the plurality of heat conducting material layers, and means for cooling the wire at or below its superconducting transition temperature, the means for cooling coupled to the layers of heat conducting material at periodic intervals along the superconducting cable system.

Another aspect of the invention is where the cryogenic coolant sources are adapted to cool the layers of heat conducting material at periodic intervals of at least about 1 meter and up to about 200 meters.

A further aspect is where the cryogenic coolant sources are adapted to cool the cable system at length intervals of about less than 1 meter.

Another aspect of the invention is where the cryogenic coolant sources further comprise a plurality of microelectromechanical systems (MEMS).

A further aspect is where the cryogenic coolant sources further comprise a plurality of nanoelectromechanical systems (NEMS).

An aspect of the invention is a method for fabricating a conduction-cooled high-temperature superconducting cable comprising manufacturing a high temperature superconducting wire, wrapping the wire with an inner thermal barrier, encasing the inner thermal barrier with a layer of thermal conducting material, wrapping the layer of thermal conducting material with an outer thermal barrier, and coupling a plurality of cryogenic coolant sources to the layer of thermal conducting material at predetermined positions.

Another aspect of the invention is a method where the superconducting wire comprises a material having a transition temperature below approximately 110 K.

A further aspect is a method where the wire comprises a superconducting material chosen from the group consisting essentially of $(Bi,Pb)_2Sr_2Ca_2Cu_3O_{10}$, $YBa_2Cu_3O_7$ and $MgB_2$.

A still further aspect is a method where the heat conducting material comprises copper or copper alloys.

Another aspect is a method where the outer thermal insulation comprises layers of a highly reflective radiant barrier material alternating with a low-conductivity spacer material.

A further aspect is a method where the highly reflective radiant barrier material comprises aluminum foil and the low conductivity spacer material comprises fiberglass paper.

A yet further aspect is a method where the outer thermal insulation comprises a thermal conductivity of about $3.7 \times 10^{-5}$ W/m-K and a layer density of about 20 layer/cm.

Another aspect of the invention is a method where the cryogenic coolant sources are adapted to use a coolant chosen from the group consisting of helium, hydrogen, nitrogen, argon, neon, air and oxygen.

A further aspect is a method where the cryogenic coolant sources are adapted to cool the layers of heat conducting material at periodic intervals along the superconducting cable of at least about 1 meter and up to about 200 meters.

A still further aspect is a method where the cryogenic coolant sources are adapted to cool the cable system at periodic intervals along the superconducting cable of about less than 1 meter.

Another aspect is a method where the cryogenic coolant sources further comprise a plurality of microelectromechanical systems (MEMS).

A further aspect is a method where the cryogenic coolant sources further comprise a plurality of nanoelectromechanical systems (NEMS).

An aspect of the invention is a method for fabricating a conduction-cooled high-temperature superconducting cable that comprises performing heat transfer calculations to determine the dimensions of a high temperature superconducting wire, an inner thermal barrier, a layer of thermal conducting material, an outer thermal barrier, and spacing intervals of cryogenic coolant sources necessary to operate the superconducting cable below the critical temperature of the high temperature superconducting wire, manufacturing the high temperature superconducting wire, wrapping the wire with the inner thermal barrier, encasing the inner thermal barrier with the layer of thermal conducting material, wrapping the layer of thermal conducting material with the outer thermal barrier, and coupling a plurality of the cryogenic coolant sources to the layer of thermal conducting material at calculated spacing intervals.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 5. It will be appreciated that the apparatus may vary as to configuration and as to details of the parts, and that the method may vary as to the specific steps and sequence, without departing from the basic concepts as disclosed herein.

Several materials conduct electricity with zero resistance below a certain temperature, called critical transition temperature ($T_c$). Some examples of such superconducting materials are: $(Bi,Pb)_2Sr_2Ca_2Cu_3O_{10}$, also called BSCCO-2223 ($T_c$=110 K), $YBa_2Cu_3O_7$ ($T_c$=90 K) and $MgB_2$ ($T_c$=39 K). Other superconducting materials with a $T_c$ in the range of 39 K to 110 K may be used without departing from the teachings of the invention. Low cost cooling of superconducting devices below the critical transition temperature is an important goal for commercialization of superconducting power transmission systems. Existing superconductor systems require circulation of a coolant such as liquid helium (He) to keep the superconductor wire below the critical temperature. The emergence of high-temperature superconducting (HTS) material makes possible the use of liquid nitrogen, ($N_2$) hydrogen ($H_2$) or other materials with a relatively higher boiling point as a coolant in superconducting transmission lines, thus reducing the cost of heat removal with the coolant. Since in addition, HTS material has the advantage of high power density and zero environmental impact, power transmission lines using HTS cables are among the most promising applications of higher temperature superconductors.

In the present invention, a cable with multiple concentric layers has a core superconductor wire, one or more layers of copper, and multiple layers of insulation arranged to keep the core superconductor wire below its critical temperature. Cryogenic coolant sources are coupled to the copper layers and/or the superconductor wire at periodic intervals along the cable and used to conduct heat away from the cable. Heat that enters the cable radially through the outer insulation layer is channeled axially towards the cable's cryogenic coolant sources by the copper layers instead of allowing it to move radially inward towards the cold superconductor.

The thermal conductivity of copper and copper alloy varies with temperature. In the cryogenic temperature range, the thermal conductivity of copper ranges from about 300 W/m-K at about 100 K to a high value of around 2000 W/m-K at about 20 K. This can be one to three or more orders of magnitude greater than the thermal conductivity of HTS wire materials at their critical temperature.

A multilayer insulation consisting of alternating layers of a highly reflecting material, such as aluminum foil, and a low-conductivity spacer, such as fiberglass paper is preferred. The value of the thermal conductivity of insulation used for the examples in this application and the embodiments of this invention, $k_m = 3.7 \times 10^{-5}$ W/m-K, corresponds to a multilayer insulation made with alternating layers of 0.006-mm aluminum foil and 0.15-mm fiberglass paper with a layer density of 20 layer/cm.

Figure 1:
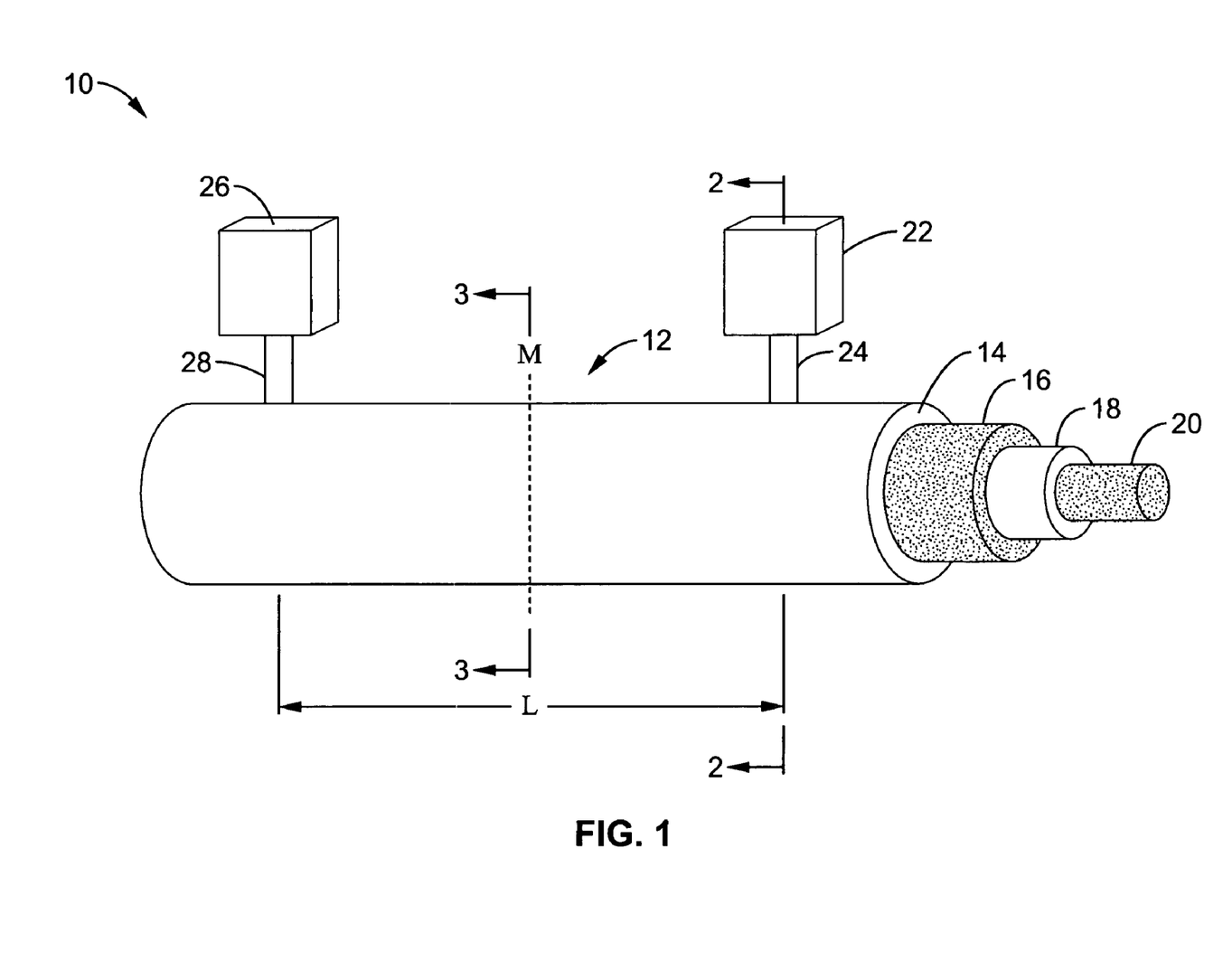
FIG. 1 is a perspective schematic view of a superconductor cable system showing the cable layers and cryogenic cooling sources at periodic intervals.

FIG. 1 is a schematic perspective view of a High Temperature Superconducting (HTS) cable system generally designated 10 and in accordance with the present invention. HTS cable body 12 comprises an outer insulation layer 14, a layer of heat conducting material 16 positioned radially inward from outer insulation layer 14, an inner insulation layer 18 positioned inward of heat conducting material 16 and a core of HTS wire 20. Although HTS wire 20 is illustrated here with a circular cross section, it can be other geometric cross sections such as rectangular, triangular or cylindrical without departing from the teachings of this invention. Positioned along the outside of cable body 12 is a first cryogenic coolant source 22 having a first heat conduit 24 that is coupled to heat conducting material 16 and HTS wire 20 (see FIG. 2). First cryogenic coolant source 22 can be a reservoir of coolant, part of a distribution system of coolant, or a stand alone compressor or refrigeration system for producing cryogenic coolant. First heat conduit 24 is preferably a refrigerator system evaporator coil, but could also be a liquid coolant heat exchanger a convection heat pipe or a thermal conductor between cryogenic coolant source 22 and heat conducting material 16. A second cryogenic coolant source 26 is positioned on cable body 12 at a distance L from cryogenic coolant source 22, and has a second heat conduit 28 that is also coupled to heat conduction material 16. Point M on cable body 12 is designated equidistant between first and second heat conduit 24, 28. Point M is L/2 distance from each heat conduit 24, 28.

Cryogenic coolant sources 22, 26 can use different coolants with boiling points in the cryogenic temperature range including helium, hydrogen, nitrogen, argon, neon, air, oxygen or mixtures thereof. Cryogenic coolant sources 22, 26 can be mechanical or electromechanical and can be of a macro scale, micro scale or nano scale. Cryogenic coolant sources 22, 26 are shown schematically positioned outside cable body 10 but may be integrated into cable body 10 without departing from the teachings of the invention. Cryogenic coolant sources 22, 26 can be powered from external sources of power or extract power from the HTS superconductor wire 20.

Figure 2:
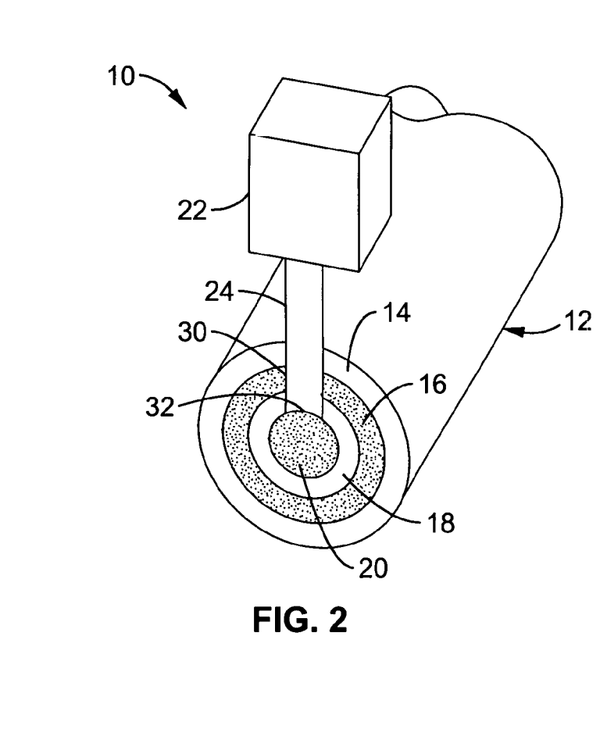
FIG. 2 is cross section schematic view of the superconductor cable shown in FIG. 1 and taken at line 2-2 showing the interface of the cryogenic cooling source and the heat conducting layer.

FIG. 2 is a schematic cross section view of HTS cable system 10 taken at line 2-2 in FIG. 1. Heat conduit 24 of first cryogenic coolant source 22 penetrates outer insulation layer 14 and is in thermal contact with heat conducting material 16 at interface 30. Heat conduit 24 also penetrates inner insulation layer 18 and is in thermal contact with HTS wire 20 at interface 32.

Figure 3:
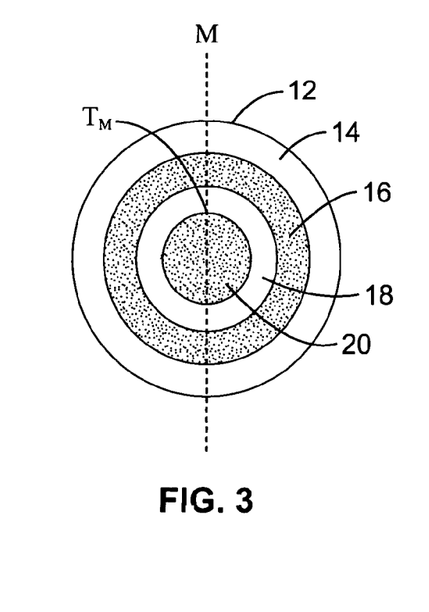
FIG. 3 is a cross section schematic view of the superconductor cable shown in FIG. 1 and taken at line 3-3 showing the position of the maximum temperature for the HTS wire.

FIG. 3 is a schematic cross section view of HTS cable system 10 taken at line 3-3 in FIG. 1. Numerical analysis has determined that for this cable configuration, the location of highest temperature on HTS wire 20 will be midway between first, second cryogenic coolant sources 22, 26, designated as position M on the cable body 10 shown in FIG. 1, and at the interface of HTS wire 20 and inner insulation 18. This position where the highest or maximum temperature of the HTS wire 20 will occur is designated here as Tm. Superconducting cable configuration can be optimized for a specific Tm with heat transfer calculations as will be discussed below.

Referring back to FIG. 2, in a first embodiment of the invention, a cable body 12 has an overall radius (R) of about 5 cm with a core HTS wire 20 of $MgB_2$ having a radius ($r_1$) of about 0.8 cm. The inner insulation layer 18 is about 0.05 cm thick and a heat conducting copper layer 16 is about 0.05 cm thick. First, second cryogenic coolant sources 22, 26 use liquid He as the coolant and are positioned 12.5 meters apart, designated as length L in FIG. 1. For this configuration with an ambient temperature of 300 K, the temperature at Tm will be about 15 K, which is below the critical temperature for $MgB_2$ of 39 K.

For comparison, a superconducting cable of similar dimensions and length as above, but with the copper layer 16 replaced by an insulation layer with thermal conductivity of $k_m = 3.7 \times 10^{-5}$ W/m-K, will have a temperature Tm of over 100 K at Tm. The critical temperature for $MgB_2$ of 39 K. is exceeded and this configuration without the copper layer will not support superconduction.

In a second embodiment of a superconducting cable 12 with about a 5 cm radius, the radius of the $MgB_2$ HTS wire 20 is 0.2 cm, the thickness of the inner insulation layer 18 is about 0.1 cm and the thickness of the copper layer 16 is about 0.1 cm. With first, second cryogenic coolant sources 22, 26 using He coolant and spaced a distance L of about 12.5 m apart, Tm is about 7.4 deg K at an ambient temperature of 300 deg K. Thus the reduced radial dimensions of the HTS wire 20, inner insulation layer 18 and copper layer 16 result in a lower core temperature for a given cable length L.

Figure 4:
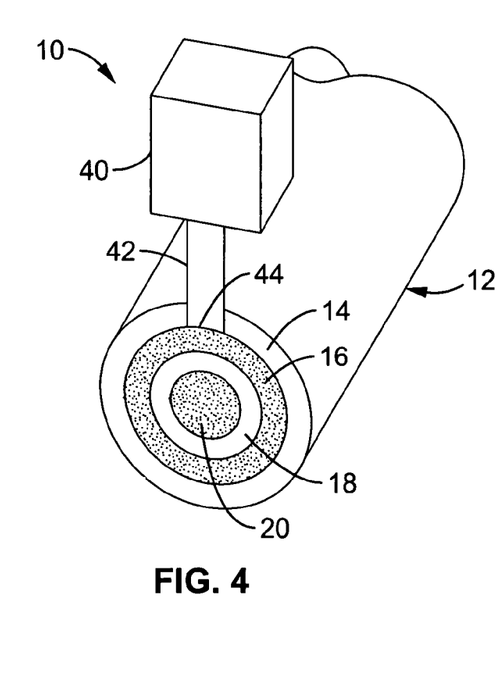
FIG. 4 is a schematic cross section view of another embodiment of a superconductor cable with the cryogenic cooling source connected only to the heat conducting layer.

In a third embodiment, the parameters of the second embodiment of superconducting cable are the same except the length L between first, second cryogenic coolant sources 22, 26 has been increased to 50 meters. With ambient conditions of 300 K, the temperature at Tm at the HTS wire 20 and inner insulation 18 interface is about 28.2 K which is below the critical temperature for $MgB_2$ of 39 K. Thus a longer distance between cryogenic coolant sources is facilitated by a smaller diameter copper sheath and wire core. These three embodiments are summarized below in Table 1. FIG. 4 is a schematic cross section view of another mode of an HTS cable system 10 with a cryogenic coolant source 40 having a heat conduit 42. Heat conduit 42 is configured to make thermal contact only with heat conducting material 16 at interface position 44.

In further embodiments according to the invention, BSSCCO-2233, ($T_c$ 110 K), is used as HTS core wire 20. The relatively higher operating temperature of this superconductor wire allows a cable system to be operated with cryogenic coolant sources using Hydrogen ($H_2$), (boiling point 20.3 K), Nitrogen ($N_2$) (boiling point 77.4 K) or other gases or gas mixtures with a boiling point below the critical temperature of BSSCCO-2233 of 110 K.

Using higher operating temperatures for superconducting systems provides significant savings in coolant operating costs. For example, the Carnot coefficient of performance for He is 5.1 times lower than the one for $H_2$ which means increased refrigeration work is required with He as a coolant. The Carnot coefficient of performance for $H_2$ is 4.8 times lower than the one for $N_2$. In other words, it takes about 25 times the energy to remove one watt of heat at 4.2 K with He as a coolant compared to removing one watt of heat at 77 K with $N_2$. From the viewpoint of refrigeration work required to keep the temperature of the superconductor wire below its critical temperature, nitrogen is preferable to hydrogen, and hydrogen is preferable to helium. On the other hand, operation using nitrogen as a coolant requires installation of a higher number of refrigeration systems or cryogenic coolant sources, located at shorter periodic length intervals, than using hydrogen and helium; however each of these nitrogen sources has a smaller power requirement.

In a fourth embodiment of the invention, a cable body 12 with a radius of about 10 cm has a core of HTS wire 20 of BSSCCO-2233 with a radius of about 0.1 cm, an inner insulation layer 18 with a thickness of about 0.1 cm, a copper layer 16 with a thickness of about 0.2 cm and an outer insulation layer 14. First, second cryogenic coolant sources 22, 26 employ liquid $H_2$ as a coolant and are positioned at distance L about 200 meters apart. For this configuration, Tm will be about 87.5 deg K when the ambient temperature is about 300 deg K. In a fifth embodiment, the copper layer 16 is reduced to a thickness of about 0.1 cm, and the remaining parameters remain the same. Tm will be about 157 deg K, which is above the critical temperature required by HTS wire 20. Thus this fifth embodiment will not support superconduction.

However, in a sixth embodiment, if the copper layer 16 is increased to a thickness of about 0.4 cm and the remainder of cross section dimensions of cable components remain the same as above, Tm will be about 63 K which is below the critical temperature of 110 K.

In order to compare the efficacy of different coolants, Table 2 summarizes the cable system embodiments described above with different copper layer thicknesses. Embodiments 4 through 6 use He as a coolant. Embodiments 7 through 9 use $H_2$ as a coolant. The heat load for the two cryogenic coolant sources combined (one at each cable segment end) is expressed in watts (W).

As can be seen, for embodiments 4 and 7 where the thickness of the copper layer is 0.1 cm, Tm is shown with an * and is above the critical temperature required. These embodiments will not support superconduction. For embodiments 5 and 8, the thickness of the copper layer is about 0.2 cm and $H_2$ coolant uses less energy than He. For embodiments 6 and 9, the copper layer is about 0.3 cm and a lower temperature at Tm is maintained compared with embodiments 5 and 8 respectively. $H_2$ coolant using less energy than He in embodiment 9 compared to embodiment 6.

Further embodiments of the invention use $N_2$ as a coolant. Referring to

FIG. 1, embodiment 10 through 12 have a cable body 12 with a radius (R) of about 10 cm, a core of HTS wire 20 of BSSCCO-2233 with a radius ($r_1$) of about 0.1 cm, an inner insulation layer 18 with a thickness of about 0.1 cm, a copper layer 16 and an outer insulation layer 14. Cryogenic coolant sources 22, 26 employ $N_2$ and here are spaced a distance L about 50 m apart. Table 3 summarizes the maximum temperature Tm for the HTS wire and heat load on the combined cryogenic coolant sources using $N_2$ as a coolant with different thicknesses of copper layer 16.

As can be seen in Table 3, a superconducting cable using cryogenic coolant sources employing $N_2$ and spaced 50 meters apart can maintain Tm below the critical temperature required. It can be shown that for an equivalent 200 meter cable, four 50 meter segments with $N_2$ cryogenic coolant sources (Table 3) will use less energy than one 200 meter segment with He or $H_2$ cryogenic coolant sources at each end (Table 2).

Figure 5:
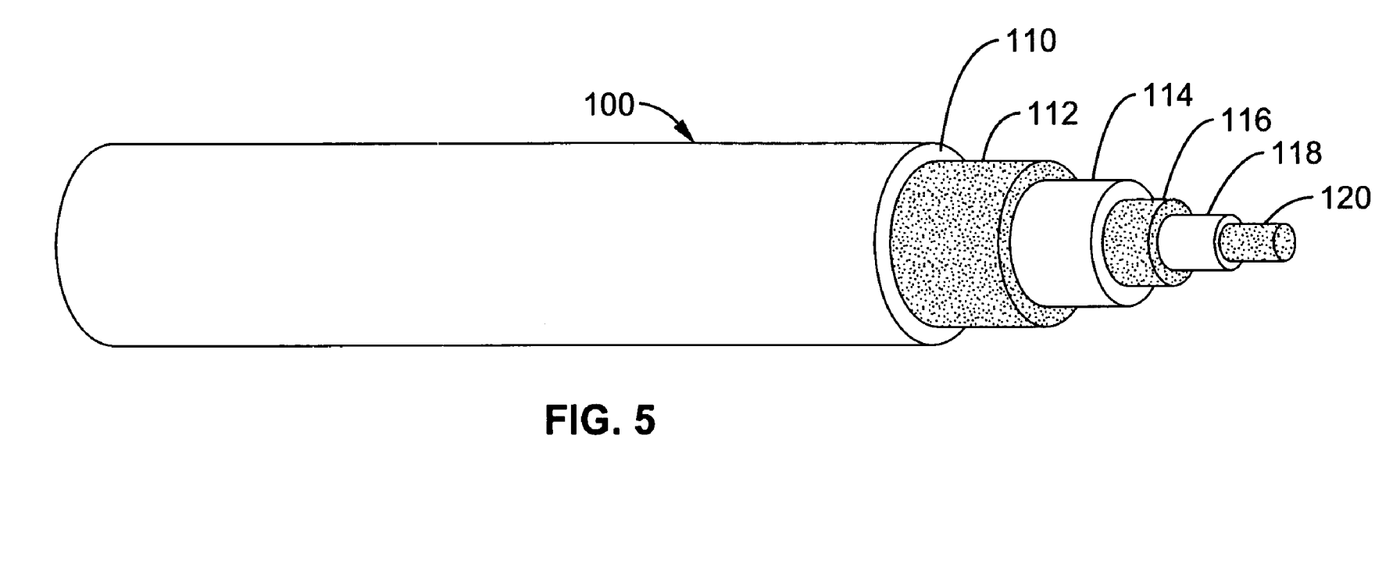
FIG. 5 is a schematic view of another embodiment of a superconducting cable with two heat conducting layers around the HTS wire.

FIG. 5 illustrates a cross section view of another mode of the invention employing multiple layers of copper in the cable. Proceeding radially inward, cable body 100 has an outer insulation layer 110, a first conducting layer 112, an interstitial insulation layer 114, a second conducting layer 116, an inner insulation layer 118 and an HTS core wire 120. In one aspect of this mode (not shown), HTS wire 120, and first and second conducting layers 112, 116 are coupled to cryogenic coolant sources in a manner previously described in FIG. 2. In another aspect of this mode (not shown), only first and second copper layers 112, 116 are coupled to the cryogenic coolant sources. Multiple conducting layers can have an effect on the time required to cool a superconductor cable down from ambient temperature as will be discussed below.

The configuration of a superconducting cable of the present invention can be optimized using heat transfer models of axial conduction cooling as described below.

Equation (1) gives the thermal conductivity $k_c$ (W/m-K) for an average sample of oxygen-free copper, as a function of temperature, T (K).

$$\log k_c = \frac{2.2154 - 0.88068 \cdot T^{0.5} + 0.29505 \cdot T - 0.048310 \cdot T^{1.5} + 0.003207 \cdot T^2}{1 - 0.47461 \cdot T^{0.5} + 0.13871 \cdot T - 0.020430 \cdot T^{1.5} + 0.001281 \cdot T^2} \quad (1)$$

The thermal conductivity for this material can vary widely depending upon the residual resistivity ratio, RRR. The values calculated with equation (1), are for RRR=100. It should be noted that the thermal conductivity of copper at cryogenic temperatures can reach values over 2000 W/m-K at about 20 K.

A multilayer insulation consisting of alternating layers of a highly reflecting material, such as aluminum foil, and a low-conductivity spacer, such as fiberglass paper is used. The value of the thermal conductivity used for this component is, $k_m = 3.7 \times 10^{-5}$ W/m-K, and corresponds to a multilayer insulation made with the materials mentioned above, with a layer density of 20 layer/cm.

HTS wire $MgB_2$ has a critical temperature of 39 K. Its thermal conductivity, in $K_s$ (W/m-K), is approximated by equation (2a) where T is in K.

$$\log k_s = -1.6158 - 3.8472 \cdot \log T + 18.003 \cdot (\log T)^2 - 21.307 \cdot (\log T)^3 + 12.111 \cdot (\log T)^4 - 3.4362 \cdot (\log T)^5 + 0.3905 \cdot (\log T)^6 \quad (2a)$$

The HTS material BSCCO-2223 ($(Bi,Pb)_2Sr_2Ca_2Cu_3O_{10}$), has a critical temperature $T_c = 110$ K. Its thermal conductivity, $k_s$ (W/m-K), in the range from 20 K to 220 K is represented by equation (2b), where T is in K.

$$\log k_s = -651.61 + 2308.7 \cdot \log T - 3371.8 \cdot (\log T)^2 + 2598.2 \cdot (\log T)^3 - 1113.8 \cdot (\log T)^4 + 251.85 \cdot (\log T)^5 - 23.475 \cdot (\log T)^6 \quad (2b)$$

At 90 K, the thermal conductivity of BSCCO is 4.2 W/m-K where the corresponding thermal conductivity of copper is 487 W/m-K (more than 100 times larger). At 30 K, the thermal conductivity of BSCCO is 2.9 W/m-K where the corresponding thermal conductivity of copper is 2143 W/m-K (more than 700 times larger).

Considering steady state wire operation, as well as no angular dependence of the boundary conditions and of the thermal properties of all employed materials, heat transfer behavior, in each of the cable's regions, is captured by the following differential equation:

$$0 = \frac{1}{r}\frac{\partial(r \cdot q_r)}{\partial r} + \frac{\partial(q_z)}{\partial z} \quad (3)$$

where $q_r$ and $q_z$ represent heat fluxes in the directions r and z, respectively. In turn, $q_r$ and $q_z$ are given by the expressions:

$$q_r = -k\frac{\partial T}{\partial r} \quad (4)$$

$$q_z = -k\frac{\partial T}{\partial z} \quad (5)$$

where k represents the thermal conductivity of the material and T is temperature. After substitution of (4) and (5), equation (3) can be rewritten as:

$$0 = \frac{\partial}{\partial r}\left(r \cdot k \cdot \frac{\partial T}{\partial r}\right) + \frac{\partial}{\partial z}\left(r \cdot k \cdot \frac{\partial T}{\partial z}\right) \quad (6)$$

We consider the following boundary conditions:

$$T(z=\pm L/2)=T_o \; \forall r \in [0, R] \quad (7)$$

$$T(r=R)=T_e \; \forall z \in [L/2, L/2] \quad (8)$$

where $T_e$ is the ambient temperature ($T_e = 300$ K), and $T_o$ is the low temperature imposed at the extremes of the cable (i.e $T_o = 4.2$ K for He).

Due to the symmetry at z=0 (position M in FIG. 1), the calculation domain work is reduced by considering only the solution for $z \in [0, L/2]$, and a new boundary condition:

$$\frac{\partial T}{\partial z}(z=0) = 0 \quad \forall r \in [0, R] \quad (9)$$

Introducing the dimensionless variables:

$$r^* = \frac{r}{R} \quad z^* = 2 \cdot \frac{z}{L} \quad T^* = \frac{T - T_o}{T_e - T_o}$$

equation (4) can be written as:

$$0 = \frac{\partial}{\partial r^*}\left(r^* \cdot \frac{k}{R^2} \cdot \frac{\partial T^*}{\partial r^*}\right) + \frac{\partial}{\partial z^*}\left(r^* \cdot \frac{4 \cdot k}{L^2} \cdot \frac{\partial T^*}{\partial z^*}\right) \quad (10)$$

This equation is valid in each material as long as the proper value of thermal conductivity is used. Therefore we can write equation (10) for four different subdomains (i=1, . . . 4), obtaining a system of four differential equations, as indicated below:

$$0 = \frac{\partial}{\partial r^*}\left(r^* \cdot \frac{k_i}{R^2} \cdot \frac{\partial T_i^*}{\partial r^*}\right) + \frac{\partial}{\partial z^*}\left(r^* \cdot \frac{4 \cdot k_i}{L^2} \cdot \frac{\partial T_i^*}{\partial z^*}\right) \quad (0\text{-}i)$$

for $i = 1, \ldots 4$.

where $T_i^*$ is the dimensionless temperature in subdomain i and $k_i$ is the thermal conductivity in subdomain i ($k_i = k_i(T_i^*)$). Thus equation (10-i) is valid for subdomain i. subdomain 1 ($[0, r_1^* = r_1/R]$) is the superconductor wire; subdomain 2 ($[r_1^*, r_2^* = r_2/R]$) is the inner insulation layer; subdomain 3 ($[r_2^*, r_3^* = r_3/R]$) is the copper layer; and subdomain 4 ($[r_3^*, 1]$) is the outer insulation layer. $k_1$; $k_2$ and $k_4$; $k_3$ are the thermal conductivities of superconductor; thermal insulator; copper respectively.

The resulting system of four second-order differential equations is solved for $T_1^*$, $T_2^*$, $T_3^*$ and $T_4^*$, as functions of $r^*$ and $z^*$, when combined with four boundary conditions in each subdomain (16 in total). In addition to the boundary conditions implied by (7) and (8), and those due to the symmetry of the cylinder ((12) and (16-i)), we consider the continuity of the temperature ((13-i)) and the continuity of the radial heat flux ((14-i)) (shown below) at the interface between two subdomains. The complete set of 16 boundary conditions is:

$$T_4^*(r^* = 1) = 1 \quad \forall z^* \in [0, 1] \quad (11)$$

$$\frac{\partial T_i^*}{\partial r^*}(r^* = 0) = 0 \quad \forall z^* \in [0, 1] \quad (12)$$

$$T_i^*(r^* = r_i^*) = T_{i+1}^*(r^* = r_i^*) \quad (13\text{-}i)$$

$\forall z^* \in [0, 1] \quad$ for $i = 1, \ldots 3$ $$k_i \frac{\partial T_i^*}{\partial r^*}(r^* = r_i^*) = k_{i+1} \frac{\partial T_{i+1}^*}{\partial r^*}(r^* = r_i^*) \quad (14\text{-}i)$$

$\forall z^* \in [0, 1] \quad$ for $i = 1, \ldots 3$ $$T_i^*(z^* = 1) = 0 \quad \forall r^* \in \text{Subdomain } i \quad \text{for } i = 1, \ldots 4 \quad (15\text{-}i)$$

$$\frac{\partial T_i^*}{\partial z^*}(z^* = 0) = 0 \quad \forall r^* \in \text{Subdomain } i \quad \text{for } i = 1, \ldots 4 \quad (16\text{-}i)$$

For proper operation of a superconducting cable, it is necessary to maintain the temperature of the superconducting wire below its critical transition temperature. The temperature profile in the superconducting wire can be found by solving the system of equations (10-i) (i=1, . . . 4) for a particular cable configuration (specific values of $r_i^*$ and L/R). In the embodiments of the invention with a copper layer, the maximum temperature in the temperature profile along the wire, Tm, is determined to occur at the midpoint between the cryogenic coolant sources and at the interface of the superconductor wire and the inner insulation as described previously. Different cable configurations can be evaluated and those that result in maximum temperatures Tm below the superconductor's transition temperature can be used for superconducting power transmission.

The program FEMLAB® version 2.3 may be used to perform the numerical calculations above. With this software, the aforementioned PDE (Partial Differential Equation) problem is approximated using the Finite Element Method (FEM). FEMLAB® generates automatically a triangular mesh that covers the domain under consideration and takes into account the problem geometry. The solution is represented as a weighted linear combination of a linearly independent set of piecewise linear polynomials $\phi_k(z^*, r^*)$. This approximation requires that the polynomials be pieced together in such a manner that the resulting function is continuous with an integrable or continuous first or second derivative on the entire domain, and takes the form:

$$T^*(z^*, r^*) = \sum_{k=1}^{m} U_k \cdot \varphi_k(z^*, r^*) \quad (17)$$

where m is the total number of elements in the mesh (triangles) and $U_k$ are coefficients that are determined so as to vanish the projection of the approximation error on the finite dimensional space spanned by the approximating polynomials $\phi_k$.

The approximate solution can be improved by increasing the number of elements in the mesh (refining the mesh), i.e. by dividing the elements into smaller elements. Such a refined mesh requires longer calculation time and higher computer memory availability. This simulation tool can be used to confirm that the highest temperature in the HTS superconductor wire is attained at the interface with the inner insulation layer and in the middle of the axial length of the wire the furthest location from the cryogenic coolant sources (Tm in FIG. 3).

This simulation tool FEMLAB® can also be used to verify that in embodiment 1, if copper is not used to channel the radial heat axially, but additional thermal insulator is used instead of a copper layer, i.e.: $k_2 = k_3 = k_4 = k_m = 3.7 \times 10^{-5}$ W/m-K, in the equations above, the highest temperature in the HTS superconductor wire using He as a coolant will be approximately 104 K, and above the critical superconducting temperature of 39 K for $MgB_2$.

The simulation tool can also be used to show that the axial heat flux is higher in the copper layer than in the other materials (close to 3 orders of magnitude higher when compared with the superconductor and 7 orders with respect to the thermal insulation layers), as expected due to copper's thermal conductivity. The copper layer is the preferred track for the heat, in such a way that most of the radial heat that passes through the outer insulation layer, coming from the environment, finds an easier way to continue along the copper towards the cold extremes, making this heat flux bigger, in general, as we move in this direction. Integration of the axial heat flux over the boundary of the cable at the cold extreme gives an approximation to the total heat flow transferred to the liquid helium at one extreme. For the first embodiment above using $MgB_2$ as the HTS wire and He as the coolant, the total heat flow is calculated to be about 3.5 W, and over 95% of this heat is calculated to come from the copper layer.

Applying the equations above to the first embodiment, an insulated cable with radius, R, of 5 cm, the length of the cable L=12.5 m, and the radius of a superconductor wire of $MgB_2$, $r_1$=4 cm, can be kept below 14.5 K, which is a temperature low enough to assure the superconducting state of the wire.

An insulated cable with the same values for R and L, as above can be kept at even lower temperature if the radius of the superconductor wire is decreased and the thickness of the outer insulation layer is increased. For example, embodiment 2 with an insulated cable with radius, R, of 5 cm, the length of the cable L=12.5 m, and the radius of a superconductor wire of $MgB_2$, $r_1$=2 cm, yields a calculated maximum temperature of about 7.2 K for the wire.

In an example of optimizing cable length, the third embodiment discussed above has an insulated cable with radius R=10 cm, length L=100 m, and radius of the superconductor wire $r_1$=2 cm, and yields a calculated maximum temperature below about 25.9 K which is a temperature lower than $T_c$ for the employed HTS material $MgB_2$. The heat transfer model and simulation tools may also be used to calculate the operating conditions when using $H_2$ and $N_2$ as coolants.

Before a superconductor cable can be energized, the HTS wire must be cooled from an ambient state to below the critical temperature. Numerical analysis has determined that the time required to cool a superconducting cable from ambient condition to below critical temperature is reduced by using multiple layers of copper in the cable and coupled to the cryogenic coolant sources.

The time period of a cable's initial cool down from ambient temperature to operating temperature may be determined by carrying out a detailed calculation of heat transfer in the cable under transient conditions. These calculations determine the time required to cool down the superconducting wire to a temperature below its critical value. BSCCO-2223 is used in the calculation examples below since long length BSCCO-2223 wire is readily available and manufactured by a number of companies worldwide.

First the properties of the materials are determined. The values for thermal conductivity of copper, and the BSCCO-2223 wire are expressed in equations (1) and (2b) above. A multilayer insulation consisting of alternating layers of 0.006-mm aluminum foil and 0.15-mm fiberglass paper has a thermal conductivity of, $k_m$=3.7×10$^{-5}$ W/m-K, and corresponds to a multilayer insulation made with a layer density of 20 layer/cm.

Equation (18) gives a correlation for the specific heat of copper, $cp_c$ (J/kg-K), as a function of temperature, T (K).

$$\log c_{p_c} = -1.91844 - 0.15973 \cdot \log T + 8.61013 \cdot (\log T)^2 - 18.99640 \cdot (\log T)^3 + 21.96610 \cdot (\log T)^4 - 12.73280 \cdot (\log T)^5 + 3.54322 \cdot (\log T)^6 - 0.37970 \cdot (\log T)^7 \quad (18)$$

The mass density of copper, $\rho_c$, is approximated to 8933 kg/m$^3$.

The specific heat of the multilayer insulation, $cp_m$, is approximated from each component's specific heat and mass fraction as follows:

$$c_{P_m} = mf_{Al} \cdot c_{P_{Al}} + (1 - mf_{Al}) \cdot c_{P_{fg}} \quad (19)$$

The specific heats of aluminum, $cp_{Al}$ (J/kg-K), and fiberglass, $cp_{fg}$ (J/kg-K), are correlated with temperature, T (K):

$$\log c_{p_{Al}} = 46.6467 - 314.292 \cdot \log T + 866.662 \cdot (\log T)^2 - 1298.30 \cdot (\log T)^3 + 1162.27 \cdot (\log T)^4 - 637.795 \cdot (\log T)^5 + 210.351 \cdot (\log T)^6 - 38.3094 \cdot (\log T)^7 + 2.96344 \cdot (\log T)^8 \quad (20)$$

$$\log c_{p_{fg}} = -2.4083 + 7.6006 \cdot \log T - 8.2982 \cdot (\log T)^2 + 7.3301 \cdot (\log T)^3 - 4.2386 \cdot (\log T)^4 + 1.4294 \cdot (\log T)^5 - 0.24396 \cdot (\log T)^6 + 0.015236 \cdot (\log T)^7 \quad (21)$$

Using mass densities of 2702 kg/m$^3$ for aluminum and 32 kg/m$^3$ for fiberglass, the mass fraction of aluminum foil in the composite material is $mf_{Al}$=0.7716, and the bulk mass density of the multilayer insulation is calculated as $\rho_m$=42.024 kg/m$^3$.

The specific heat, $c_{p_s}$ (J/mol-K), for BSCCO-2223 in the range from 20 K to 300 K is represented by equation, (22) where T is in K.

$$\log c_{p_s} = -6.6155 + 9.3975 \cdot \log T - 3.2259 \cdot (\log T)^2 + 0.3796 \cdot (\log T)^3 \quad (22)$$

Calculation of specific heat per mass of superconductor is obtained using an approximate molecular weight for BSCCO-2223 of 1023.28 g/mol. The mass density of the superconductor is approximately $\rho_s$=6310 kg/m$^3$.

For time-dependent wire operation, with no angular dependence of the boundary conditions and of the thermal properties of all employed materials, heat transfer behavior, in each of the cable's regions, is captured by the differential equation:

$$\rho \cdot c_p \cdot \frac{\partial T}{\partial t} = -\left[\frac{1}{r}\frac{\partial (r \cdot q_r)}{\partial r} + \frac{\partial (q_z)}{\partial z}\right] \quad (23)$$

where $\rho$ is the mass density of the material, $c_p$ represents its specific heat, T(t, r, z) is the temperature as a function of time t, radial distance r, and axial distance z. $q_r$ and $q_z$ represent heat fluxes in the directions r and z, respectively.

In turn, $q_r$ and $q_z$ are given by the expressions:

$$q_r = -k\frac{\partial T}{\partial r} \quad (24)$$

$$q_z = -k\frac{\partial T}{\partial z} \quad (25)$$

where k represents the thermal conductivity of the material. After substitution of (24) and (25), equation (23) can be rewritten as:

$$\rho \cdot c_p \cdot r \cdot \frac{\partial T}{\partial t} = \frac{\partial}{\partial r}\left(r \cdot k \cdot \frac{\partial T}{\partial r}\right) + \frac{\partial}{\partial z}\left(r \cdot k \cdot \frac{\partial T}{\partial z}\right) \quad (26)$$

The following are initial and boundary conditions:

$$T(0, r, z) = T_e \quad \forall r \in [0, R]; \forall z \in [-L/2, L/2] \quad (27)$$

$$T(t, r, \pm L/2) = T_o \quad \forall r \in [0, R]; \forall t \in [0, \infty) \quad (28)$$

$$T(t, R, z) = T_e \quad \forall z \in [-L/2, L/2]; \forall t \in [0, \infty) \quad (29)$$

$$\frac{\partial T}{\partial r}(t, 0, z) = 0 \quad \forall z \in [-L/2, L/2]; \forall t \in [0, \infty) \quad (30)$$

where $T_e$ is the ambient temperature ($T_e$=300 K), and $T_o$ is the low temperature imposed at the extremes of the cable ($T_o$=77.4 K if liquid nitrogen is used or $T_o$=20.3 K if liquid hydrogen is used).

Due to the symmetry at z=0, the point midway between the cryogenic coolant sources, we can reduce the calculation domain by considering only the solution for z∈[0, L/2], and a new boundary condition:

$$\frac{\partial T}{\partial z}(t, r, 0) = 0 \quad \forall r \in [0, R]; \forall t \in [0, \infty) \qquad (31)$$

Introducing the dimensionless variables:

$$r^* = \frac{r}{R}$$

$$z^* = 2 \cdot \frac{z}{L}$$

$$T^* = \frac{T - T_o}{T_e - T_o}$$

-continued $$t^* = \frac{t}{t_f}$$

where $t_f$ is final time, equation (26) can be written as:

$$\frac{\rho \cdot c_P \cdot L^2}{t_f} \cdot r^* \cdot \frac{\partial T^*}{\partial t^*} = \frac{\partial}{\partial r^*}\left(\left(\frac{L}{R}\right)^2 \cdot k \cdot r^* \cdot \frac{\partial T^*}{\partial r^*}\right) + \frac{\partial}{\partial z^*}\left(4 \cdot k \cdot r^* \cdot \frac{\partial T^*}{\partial z^*}\right) \qquad (32)$$

This equation is valid in each material as long as the proper values of mass density, specific heat and thermal conductivity are used. Therefore we can write equation (32) for five different subdomains (i=1, . . . 5), obtaining a system of five differential equations, as indicated below:

$$\frac{\rho_i \cdot c_{p_i} \cdot L^2}{t_f} \cdot r^* \cdot \frac{\partial T_i^*}{\partial t^*} = \qquad (33)\text{-}i$$
$$\frac{\partial}{\partial r^*}\left(\left(\frac{L}{R}\right)^2 \cdot k_i \cdot r^* \cdot \frac{\partial T_i^*}{\partial r^*}\right) + \frac{\partial}{\partial z^*}\left(4 \cdot k_i \cdot r^* \cdot \frac{\partial T_i^*}{\partial z^*}\right) \text{ for } i = 1, \ldots 5$$

where $T_i^*$ is the dimensionless temperature in subdomain i, and $\rho_i$, $c_{p_i}$, and $k_i$ are mass density, specific heat and thermal conductivity, respectively, in subdomain i ($c_{p_i} = c_{p_i}(T_i^*)$, $k_i = k_i(T_i^*)$). Thus equation (33)-i is valid for subdomain i. Subdomain 1 ([0, $r_1^* = r_1/R$]) is the superconductor wire; subdomain 2 ([$r_1^*$, $r_2^* = r_2/R$]) is the inner copper layer; subdomain 3 ([$r_2^*$, $r_3^* = r_3/R$]) is the inner insulation layer; subdomain 4 ([$r_3^*$, $r_4^* = r_4/R$]) is the outer copper layer; and subdomain 5 ([$r_4^*$, 1]) is the outer insulation layer. $k_1$; $k_2$ and $k_4$; $k_3$ and $k_5$ are the thermal conductivities of superconductor; copper; thermal insulator respectively, and the same correlation applies to densities and specific heats.

The resulting system of five second-order differential equations is solved for $T_1^*$, $T_2^*$, $T_3^*$, $T_4^*$ and $T_5^*$ as functions of $r^*$, $z^*$ and $t^*$, when combined with four boundary conditions and one initial condition in each subdomain (a total of 20 boundary conditions and 5 initial conditions). In addition to the boundary conditions implied by (28) to (31), we consider the continuity of the temperature (36)-i and the continuity of the radial heat flux ((37)-i) (described below) at the interface between two subdomains. Therefore the complete set of boundary and initial conditions is:

$$T_5^*(t^*, 1, z^*) = 1 \quad \forall z^* \in [0, 1]; \forall t^* \in [0, 1] \qquad (34)$$

$$\frac{\partial T_1^*}{\partial r^*}(t^*, 0, z^*) = 0 \quad \forall z^* \in [0, 1]; \forall t^* \in [0, 1] \qquad (35)$$

$$T_i^*(t^*, r_i^*, z^*) = T_{i+1}^*(t^*, r_i^*, z^*) \quad \forall z^* \in [0, 1]; \forall t^* \in [0, 1] \text{ for } i = 1, \ldots 4 \qquad (36)\text{-}i$$

$$k_i \frac{\partial T_i^*}{\partial r^*}(t^*, r_i^*, z^*) = k_{i+1} \frac{\partial T_{i+1}^*}{\partial r^*}(t^*, r_i^*, z^*) \quad \forall z^* \in [0, 1]; \forall t^* \in [0, 1] \text{ for } i = 1, \ldots 4 \qquad (37)\text{-}i$$

$$T_i^*(t^*, r^*, 1) = 0 \quad \forall r^* \in \text{Subdomain } i; \forall t^* \in [0, 1] \text{ for } i = 1, \ldots 5 \qquad (38)\text{-}i$$

$$\frac{\partial T_i^*}{\partial z^*}(t^*, r^*, 0) = 0 \quad \forall r^* \in \text{Subdomain } i; \forall t^* \in [0, 1] \text{ for } i = 1, \ldots 5 \qquad (39)\text{-}i$$

$$T_i^*(0, r^*, z^*) = 1 \quad \forall r^* \in \text{Subdomain } i; \forall z^* \in [0, 1] \text{ for } i = 1, \ldots 5 \qquad (40)\text{-}i$$

In order to attain a superconducting state in the cable, it is necessary to cool down the superconducting wire from the initial ambient temperature ($T_e$=300 K) to a temperature below its critical temperature. The temperature profile in the superconducting wire at any time during the cooling process can be found by solving the system of equations (33)-i (i= 1, . . . 5) for a particular cable configuration (specific values of $r_i^*$, L/R and L).

Referring back to FIG. 5, embodiment thirteen is a cable body 100 with a 10 cm radius (R) and comprises an outer insulation layer 110, a first copper layer 112 with a thickness of about 0.05 cm, an interstitial insulation layer 114 with a thickness of about 0.05 cm, a second copper layer 116 of about 0.05 cm, an inner insulation layer 118 with a thickness of about 0.05 cm and an HTS wire 120 of BSSCCO-2233 with a radius ($r_1$) of about 0.1 cm. Cryogenic coolant sources employing $H_2$ are coupled to the first, second copper layer 112, 116 and to HTS wire 120 and spaced distance L about 10 meters apart on the cable in a manner previously described in FIG. 1. With this configuration, it will take approximately 26 hours to cool the core of HTS wire 120 at a point midway between the cryogenic coolant sources to about to about 96.6 K. In a fourteenth embodiment, cryogenic coolant sources employ $N_2$, and with the same cable dimensions as above, take about 72 hours to cool the core of HTS wire 120 to about 97.2 K. In a fifteenth embodiment, cryogenic coolant sources employing $H_2$ with the same cable dimensions as before but spaced distance L about 150 meters apart, take approximately 58 hours to cool the HTS wire 120 to about 97.2 K.

For comparison, it is estimated that a superconductor cable configured as embodiment 13 but with 1 layer of copper may take as long as 24 to cool down to critical temperature.

Table 4 summarizes the calculations of the cool down period for the three aforementioned embodiments of a superconducting cable using two layers of copper described above.

Other combinations of multiple copper layers and intervals of cryogenic coolant sources can be specified and calculations performed to balance first cost of the cable system, operation cost of the cryogenic coolant sources and time to cool to critical temperature without departing from the teachings of this invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

| Embodiment | HTS Wire radius $r_1$ cm | Copper layer thickness cm | Interval L meters | Tm K |
| --- | --- | --- | --- | --- |
| 1 | 0.8 | 0.05 | 12.5 | 15.1 |
| 2 | 0.2 | 0.1 | 12.5 | 7.4 |
| 3 | 0.2 | 0.1 | 50 | 28.2 |

TABLE 2

| Embodiment | Copper layer thickness cm | Coolant | Tm K | Heat Load (W) |
| --- | --- | --- | --- | --- |
| 4 | 0.1 | He | 130.4* | 10 |
| 5 | 0.2 | He | 55.7 | 15 |
| 6 | 0.3 | He | 39.8 | 20 |
| 7 | 0.1 | $H_2$ | 157.1* | 9 |
| 8 | 0.2 | $H_2$ | 87.5 | 14 |
| 9 | 0.3 | $H_2$ | 62.9 | 18 |

TABLE 3

| Embodiment | Copper layer thickness cm | Coolant | Tm K | Heat Load (W) |
| --- | --- | --- | --- | --- |
| 10 | 0.1 | $N_2$ | 93.2 | 1.2 |
| 11 | 0.2 | $N_2$ | 86.2 | 1.5 |
| 12 | 0.3 | $N_2$ | 84.1 | 1.9 |

TABLE 4

| Embodiment | Interval L meters | Coolant | Wire temp K | Time (hrs) |
| --- | --- | --- | --- | --- |
| 13 | 10 | $H_2$ | 96.6 | 26 |
| 14 | 15 | $H_2$ | 97.2 | 58 |
| 15 | 10 | $N_2$ | 94.2 | 72 |

What is claimed is:

1. A method for fabricating a conduction-cooled high-temperature superconducting cable comprising:
   manufacturing a high temperature superconducting wire;
   wrapping said wire with an inner thermal barrier;
   encasing said inner thermal barrier with at least one layer of thermal conducting material;
   wrapping the at least one layer of thermal conducting material with an outer thermal barrier;
   wherein the at least one layer of thermal conducting material is sandwiched between two thermal barriers; and
   coupling a plurality of cryogenic coolant sources to said at least one layer of thermal conducting material at predetermined positions;
   wherein no liquid coolant is present within or circulated through the cable.

2. A method as recited in claim 1, wherein said superconducting wire comprises a material having a transition temperature below approximately 110 K.

3. A method as recited in claim 1, wherein said wire comprises a superconducting material chosen from the group consisting of $(Bi,Pb)_2Sr_2Ca_2Cu_3O_{10}$, $YBa_2Cu_3O_7$ and $MgB_2$.

4. A method as recited in claim 1, wherein said thermal conducting material comprises copper or copper alloys.

5. A method as recited in claim 1, wherein said outer thermal barrier comprises layers of a highly reflective radiant barrier material alternating with a low-conductivity spacer material.

6. A method as recited in claim 5, wherein said highly reflective radiant barrier material comprises aluminum foil and said low conductivity spacer material comprises fiberglass paper.

7. A method as recited in claim 5, wherein said outer thermal barrier has a thermal conductivity of about $3.7 \times 10^{-5}$ W/m-K and a layer density of about 20 layer/cm.

8. A method as recited in claim 1, wherein said cryogenic coolant sources are adapted to use a coolant chosen from the group consisting of helium, hydrogen, nitrogen, argon, neon, air and oxygen.

9. A method as recited in claim 8, wherein said cryogenic coolant sources are adapted to cool said at least one layer of thermal conducting material at periodic intervals along said superconducting cable of at least about 1 meter and up to about 200 meters.

10. A method as recited in claim 8, wherein said cryogenic coolant sources are adapted to cool said cable at periodic intervals along said superconducting cable of about less than 1 meter.

11. A method as recited in claim 8, wherein said cryogenic coolant sources further comprise a plurality of microelectromechanical systems (MEMS).

12. A method as recited in claim 8, wherein said cryogenic coolant sources further comprise a plurality of nanoelectromechanical systems (NEMS).

13. A method for fabricating a conduction-cooled high-temperature superconducting cable comprising:

performing heat transfer calculations to determine the dimensions of a high temperature superconducting wire, an inner thermal barrier, a layer of thermal conducting material, an outer thermal barrier, and spacing intervals of cryogenic coolant sources necessary to operate the superconducting cable below the critical temperature of said high temperature superconducting wire;

manufacturing said high temperature superconducting wire;

wrapping said wire with said inner thermal barrier;

encasing said inner thermal barrier with said layer of thermal conducting material;

wrapping said layer of thermal conducting material with said outer thermal barrier; and coupling a plurality of said cryogenic coolant sources to said layer of thermal conducting material at calculated spacing intervals;

wherein no liquid coolant is present within or circulated through the cable.

* * * * *